United States Patent [19]
Welbourn

[11] Patent Number: 5,342,478
[45] Date of Patent: Aug. 30, 1994

[54] SELF-ALIGNED V-GROOVES AND WAVEGUIDES

[75] Inventor: Anthony D. Welbourn, Suffolk, England

[73] Assignee: British Telecommunications public limited company, London, England

[21] Appl. No.: 50,212

[22] PCT Filed: Oct. 2, 1991

[86] PCT No.: PCT/GB91/01699
§ 371 Date: May 6, 1993
§ 102(e) Date: May 6, 1993

[87] PCT Pub. No.: WO92/06394
PCT Pub. Date: Apr. 16, 1992

[30] Foreign Application Priority Data
Oct. 9, 1990 [GB] United Kingdom ............... 9021944.5

[51] Int. Cl.5 ..................... H01L 21/306; B44C 1/22; C03C 15/00; C03C 25/06
[52] U.S. Cl. ........................... 156/643; 156/647; 156/657; 156/659.1; 156/662
[58] Field of Search ............... 156/626, 630, 643, 647, 156/650, 653, 657, 659.1, 662; 385/129, 132

[56] References Cited

U.S. PATENT DOCUMENTS 4,973,133  11/1990  Matz et al. .................. 156/647 X
5,046,809   9/1991  Stein .......................... 156/647 X

FOREIGN PATENT DOCUMENTS 0331334  9/1989  European Pat. Off. .

OTHER PUBLICATIONS

Patent Abstracts of Japan, vol. 9, No. 13, Jan. 19, 1985, (P-328) (1736).
Applied Physics Letters, vol. 51, No. 26, Dec. 28, 1987, pp. 2189-2191.

*Primary Examiner*—William A. Powell
*Attorney, Agent, or Firm*—Nixon & Vanderhye

[57] ABSTRACT

A method of forming a pair of V-grooves in alignment with an array of planar waveguides comprises the steps of simultaneously forming cores for the waveguides and windows for the V-grooves covering the cores with a protective layer and forming the V-grooves through the windows. The method is such that the V-grooves are formed on each side of the array of waveguides.

25 Claims, 7 Drawing Sheets

SELF-ALIGNED V-GROOVES AND WAVEGUIDES

BACKGROUND OF THE INVENTION

1. Field of the Invention

This invention relates to a method of forming self-aligned V-grooves and planar waveguides, particularly on a silicon substrate.

2. Related Art

Planar silica waveguides comprise three oxide layers (a buffer layer, a core layer and an overlay) formed on a silicon substrate. Typically, the buffer layer is 6 to 10 µm thick, and can be thermally grown in steam or deposited using plasma enhanced chemical vapour deposition (PECVD). In this case, the core layer is a doped film of higher refractive index such as a 2 µm thick arsenosilicate glass (AsG), or a 3 to 6 µm flame hydrolysis layer (FHD) doped with germanium or phosphorus. The overlay, which is deposited after the core layer has been etched and subjected to a reflow/anneal step to remove surface roughness, is usually a 4 to 10 µm thick PECVD oxide film.

V-grooves are formed in (100) silicon wafers by placing the wafers (suitably masked) in ethylene diamine pyrocatechol and water (EDP) or other anisotropic etchant. The etch rate of silicon is orientation dependent, and the slowest etching crystal planes form the side and end walls of the V-grooves. The groove sizes are controlled by the corresponding mask windows, the accuracy of their alignment with the crystal axes, the erosion rate of the edges of the mask, and the relative etch rates of the crystal planes. Typically, the finished widths of V-grooves can be controlled to within 0.5 to 1 µm, such control being achieved using silicon nitride masks and EDP as the etchant.

A one dimensional array of parallel planar waveguides often needs accurate alignment with a one dimensional array of other optical components (such as parallel optical fibres or another array of parallel planar waveguides). Alignment is usually accomplished by providing both arrays with alignment means constituted by pairs of V-grooves. Several factors affect the accuracy of alignment of V-grooves and planar waveguides. In particular, the V-grooves must be etched towards the end of the processing schedule, because of the difficulty of exposing patterns on grooved wafers. Unfortunately, because V-groove etchants attack silica to varying degrees, the late etching of V-grooves will roughen exposed waveguide cores, which will adversely affect their waveguiding properties. These conflicting factors indicate that V-grooves cannot simply be formed as an adjunct to the known waveguide formation process.

SUMMARY OF THE INVENTION

The present invention provides a method of forming at least one V-groove in alignment with at least one planar waveguide on a silicon substrate, the method comprising the steps of simultaneously forming a respective core for the or each waveguide and a respective window for the or each V-groove, covering the or each core with a protective layer, and forming the or each V-groove through the respective window.

The invention also provides a method of forming a pair of V-grooves in alignment with an array of planar waveguides, the method comprising the steps of simultaneously forming cores for the waveguides and windows for the V-grooves, covering the cores with a protective layer, and forming the V-grooves through the windows, the method being such that the V-grooves are foraged one on each side of the array of waveguides.

Advantageously, the or each waveguide core and the or each window are formed by an etching process. Preferably, the method further comprises the steps of forming a buffer oxide layer on the silicon substrate prior to the step of forming the or each waveguide core and the or each window, and wherein the or each waveguide core is foraged on the buffer oxide layer. Conveniently, the buffer oxide layer is formed in a recess in the silicon substrate, and an overlay oxide layer constitutes the protective layer.

Preferably, the or each V-groove is formed by etching through the respective window, and the or each waveguide core is foraged from a layer of doped oxide.

In a preferred embodiment, the method further comprises the steps of forming a pad oxide layer on the silicon substrate and then a silicon nitride layer on the pad oxide layer, the silicon nitride layer forming a mask through which the recess in the silicon substrate is subsequently formed. Advantageously, the pad oxide layer is thermally grown to a thickness of 700 Å, and the silicon nitride layer is deposited by LPCVD to a thickness of 3000 Å. Conveniently, the recess is formed by etching using any silicon etchant such as KOH, EDP or a mixture of HF, $HNO_3$ and $CH_3COOH$. Advantageously, an anisotropic etchant is used to avoid undercutting the nitride.

In another preferred embodiment, the method further comprises the steps of forming a pad oxide layer on the silicon substrate, a silicon nitride layer on the pad oxide layer, and a further oxide layer on the silicon nitride layer, the further oxide layer forming a mask through which the recess in the silicon substrate is subsequently formed. Advantageously, the pad oxide layer is thermally grown to a thickness of 700 Å, the silicon nitride layer is deposited by LPCVD to a thickness of 1000 Å, and the further oxide layer is formed by PECVD to a thickness of 2000 Å. Preferably, the recess is formed with vertical side walls by a dry etching process using a mixture of $C_2F_6$ and $CHF_3$ to etch the oxide and nitride layers and $Cl_2$ or $CCl_4$ to etch the silicon substrate. In this case, the method may further comprise the step of forming nitride spacers on the vertical side walls of the recess, the nitride spacers being formed by conformal deposition of silicon nitride using LPCVD followed by an anisotropic dry etch of the nitride film using an anisotropic etchant such as $CHF_3$ and oxygen.

In either of these preferred embodiments, the buffer oxide may be thermally grown in the recess. In the first of the preferred embodiments, the buffer oxide may be subjected to a planarisation step, after which the layer of doped oxide is deposited. In this case, the doped oxide layer may be removed in the region where the or each V-groove is to be formed. Preferably, a wet buffered HF etching process is used to remove the doped oxide layer in the or each of said regions.

In an alternative embodiment, the buffer oxide is formed over the entire surface of the substrate, and subsequently removed everywhere except within a region occupying the major portion of the recess. In this case, the buffer oxide may be thermally grown, and the buffer oxide may be removed by etching, using buffered HF as etchant, through a photo-resist mask deposited on top of the buffer oxide.

In a further embodiment the buffer oxide is formed by porous anodisation of the silicon substrate. Advantageously, the porous anodisation process comprises the steps of:

(i) depositing a silicon nitride film onto an n-type silicon substrate;
(ii) forming a window in the silicon nitride layer;
(iii) diffusing a high concentration of boron through the window to form a p+ silicon region;
(iv) converting the p+ silicon region to porous silicon by anodising in HF; and
(v) subjecting the substrate to a thermal oxidation step in which the porous silicon is converted to a fully dense oxide with substantially no volume change.

BRIEF DESCRIPTION OF THE DRAWINGS

The invention will now be described in greater detail, by way of example, with reference to the accompanying drawings, in which.

DETAILED DESCRIPTION OF EXEMPLARY EMBODIMENTS OF THE INVENTION

Figure 1A:
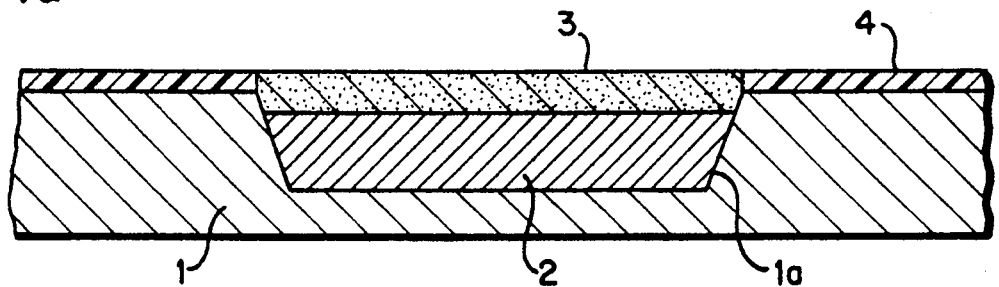
FIG. 1 (FIG. 1a–FIG. 1d) illustrates various stages in a stylised process for forming self-aligned V-grooves and planar waveguides and in accordance with the invention.
Figure 1B:
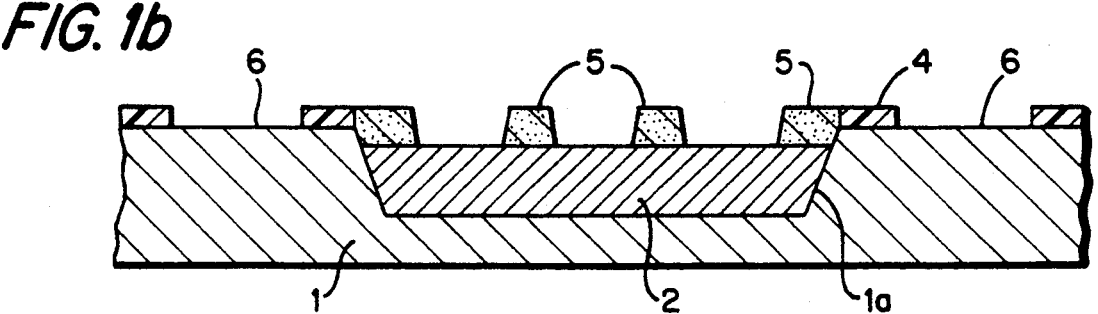

Referring to the drawings, FIG. 1a shows an initial stage in a stylised process for forming self-aligned V-grooves and planar waveguides. The structure shown includes a buffer oxide 2 and a core (doped) oxide 3 formed in a recessed region 1a of a silicon wafer 1, the remainder of the wafer being coated with a thin (1000 Å) silicon nitride film 4. Patterns for all the features (i.e. the waveguides and the V-grooves) are then defined, and the waveguide cores 5 are plasma etched (as shown in FIG. 1b). This etching step also opens up windows 6 for the V-grooves in the silicon nitride film 4, but stops at the silicon surface (see FIG. 1b).

Any surface roughness of the waveguide cores 5 is then removed by a reflow/anneal step at a temperature in excess of 875° C. An overlay (undoped) oxide layer 7 is then deposited using PECVD. Overlay oxide is then selectively removed (at 7a) from the nitride mask 4 in the regions of the windows 6 (see FIG. 1c). Finally, V-grooves 8 are formed by etching through the windows 6 (see FIG. 1d).

The process outlined above enables self-alignment of V-grooves and planar waveguides on a substrate by dividing the substrate into separate areas, each containing either waveguides or V-grooves, but not both. The substrate is prepared so that the surface of the waveguide cores 5 is substantially coplanar with the thin masking layer 4 which defines the V-groove windows 6.

Figure 4A:
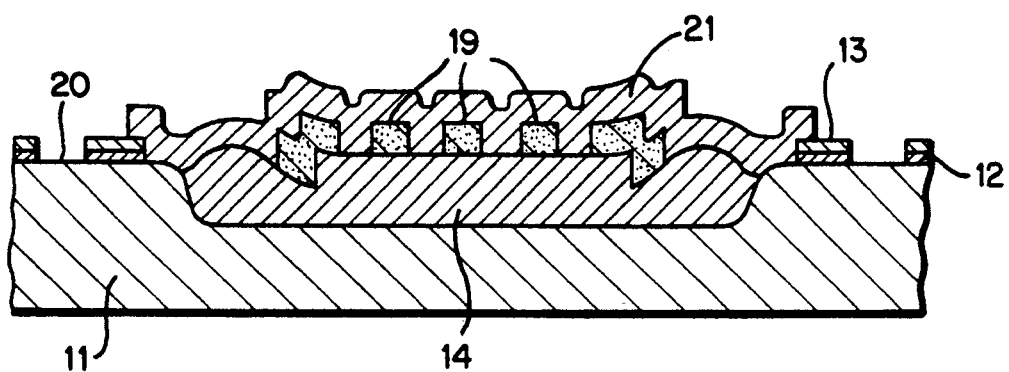
Figure 4B:
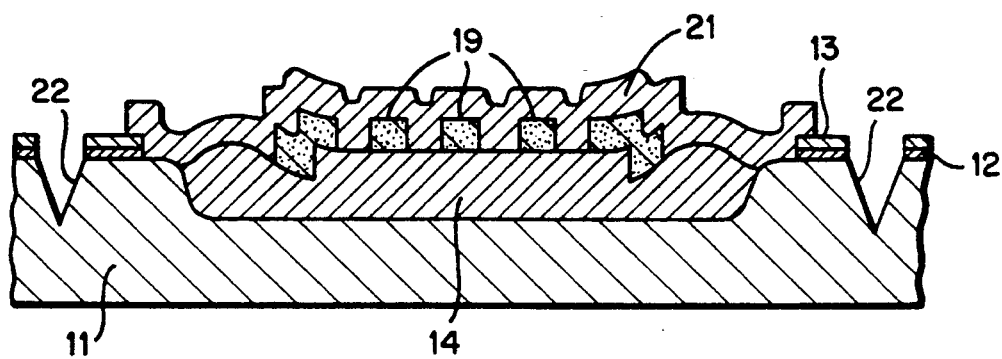

FIGS. 2 to 4 illustrate the various stages of a practical process for forming self-aligned V-grooves and planar waveguides. This process utilises the well known technique of local oxidation of silicon (LOCOS), in which silicon dioxide is grown thermally only in selected areas of a silicon substrate, the other parts of the substrate being protected. When a thick oxide film is required, the silicon is usually recessed, prior to oxidation, to overcome the large volume expansion that occurs during oxidation.

FIG. 2 shows the stages of substrate preparation utilising recessed LOCOS. A thermally grown, 700 Å thick, pad oxide layer 12 is formed on a silicon substrate 11. A silicon nitride layer 13 is then formed on top of the pad oxide layer 12 by low pressure chemical vapour deposition (LPCVD). The nitride layer 13 is used to protect the non-oxidised areas of the substrate 11, and also serves as a mask for etching a recess 11a in the substrate. This etching step uses an anisotropic etchant such as EDP or KOH so as to avoid undercutting the nitride layer 13. Alternatively, an isotropic etchant such as a mixture of HF, HN0$_3$ and CH$_3$COOH could be used. In this case any overhanging wing of nitride should be removed, e.g. ultrasonically. This stage of the process is shown in FIG. 2a. In order to get the desired thickness of buffer oxide, the nitride layer 13 must be relatively thick (3000 Å), and the pad oxide 12 is essential to relieve stress in the nitride layer.

Figure 2A:
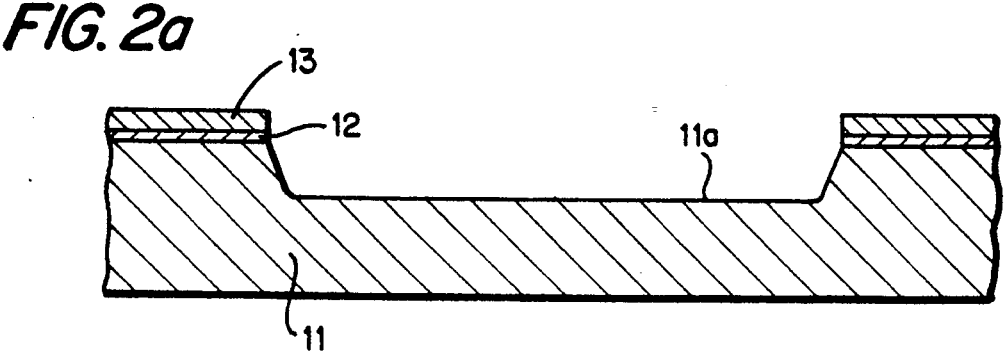
FIG. 2 (FIG. 2a–FIG. 2d) illustrates the preliminary stages of a practical process for forming self-aligned V-grooves and planar waveguides and in accordance with the invention.
Figure 2B:
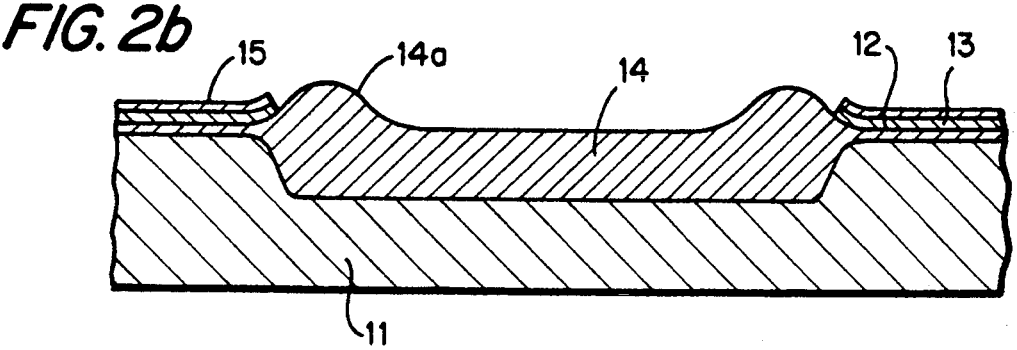
Figure 2C:
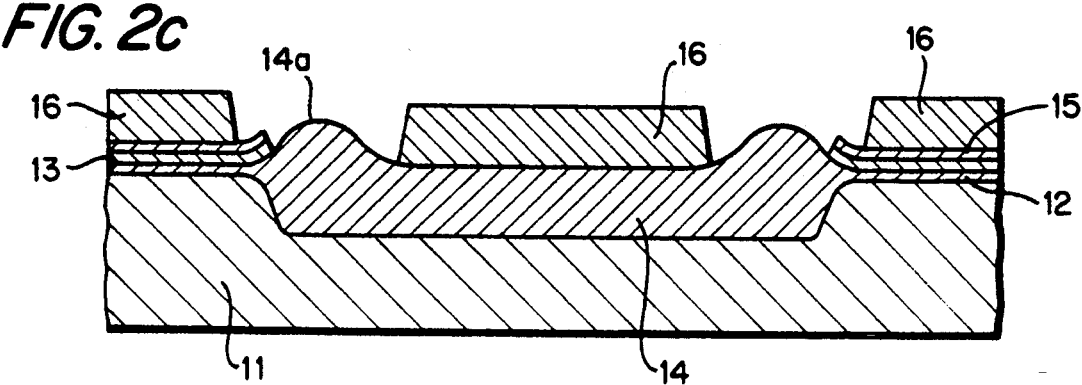
Figure 2D:
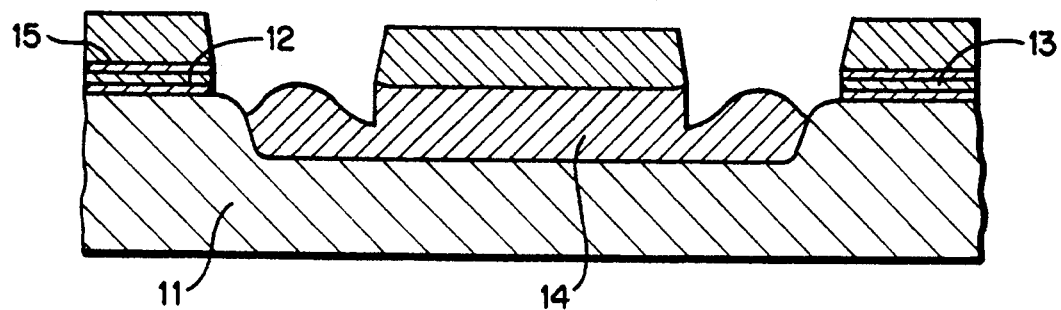
Figure 3A:
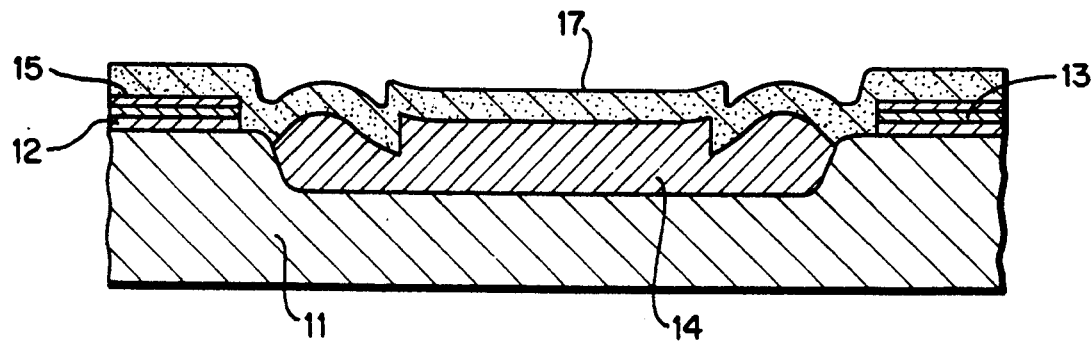
FIGS. 3 (FIG. 3a–FIG. 3d) and 4 (FIG. 4a–4b) illustrate the remaining stages of the process of FIG. 2.
Figure 3B:
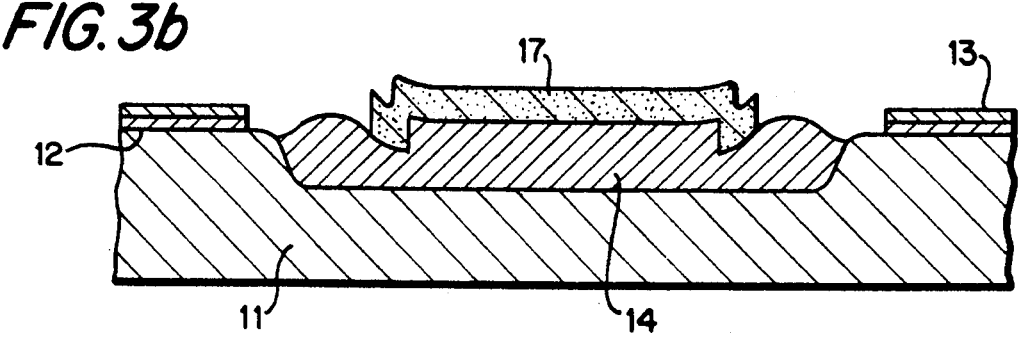
Figure 3C:
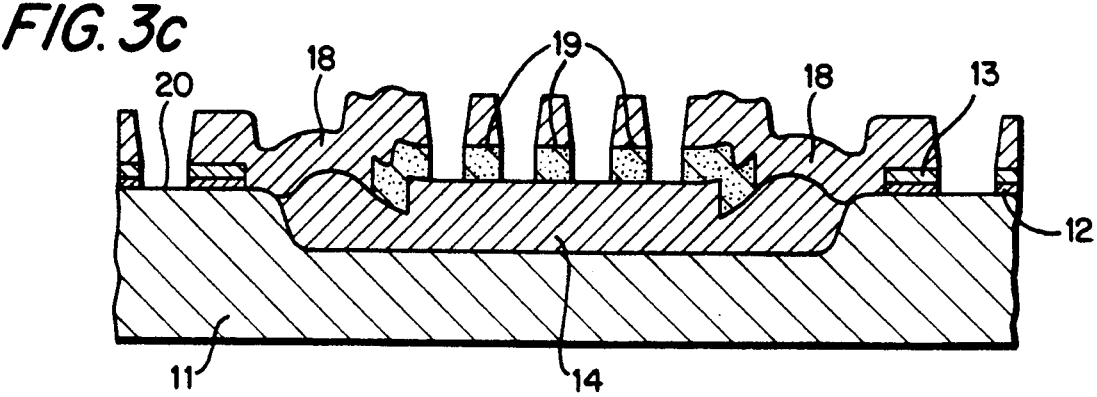
Figure 3D:
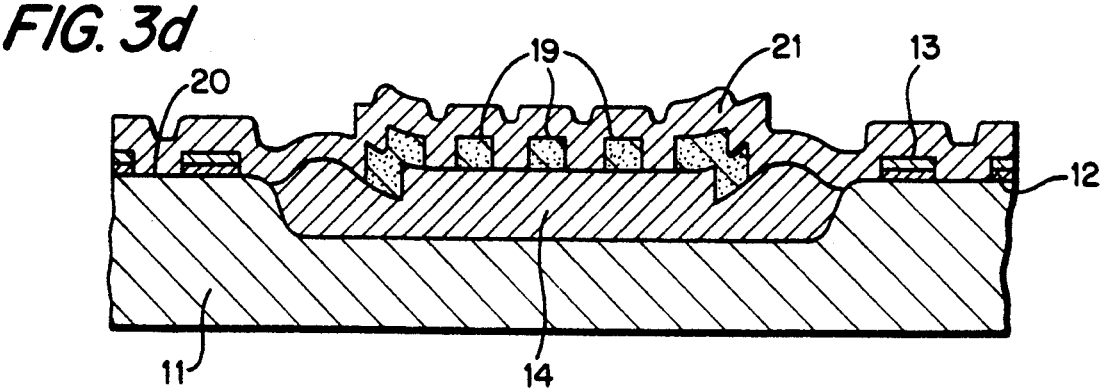

A 6 μm layer 14 of buffer oxide is then thermally grown in the recess 11a by heating the substrate for 130 hours in steam at 1000° C. The layer 14 is affected by sidewall oxidation and localised stress, and the resultant topology defines (see FIG. 2b) what is known as a bird's head 14a. The oxidation process also forms an oxidised nitride layer 15 on top of the nitride layer 13. As silicon nitride also oxidises, but much more slowly than does silicon, this process reduces the thickness of the layer 13 to about 1000 Å. The bird's head 14a is removed by a planarisation process which involves forming a photoresist mask 16 around the head (see FIG. 2c) and etching out the nitride layer 13 and parts of the buffer oxide 14 using plasma etching or other anisotropic etchant. The photoresist mask 16 is then removed using a photoresist stripper such as HN0$_3$. FIG. 2d shows the substrate at this stage of the process, this stage being equivalent to that shown in FIG. 1a.

A core (doped) oxide layer 17 is then deposited using atmospheric pressure CVD and silicon dioxide containing up to 10% arsenic. This stage of the process is shogun in FIG. 3a. The doped oxide layer 17 is then removed, in the regions where V-grooves are to be formed, by a wet buffered HF etch. This etching step also removes the oxidised silicon nitride layer 15 (see FIG. 3b). Patterns for all the features (i.e. the waveguide cores and the V-grooves) are then patterned using photoresist 18, and the waveguide cores 19 are dry etched using a mixture of CHF$_3$ and C$_2$F$_6$. This etching step also opens up windows 20 for the V-grooves (see FIG. 3c). This stage of the process is equivalent to that shown in FIG. 1b. After stripping of the photoresist 18, the waveguide cores 19 are reflowed and annealed by heating in oxygen at 950° C. for 20 minutes. A 4 μm overlay layer 21 of oxide is then deposited using PECVD (see FIG. 3d). This completes the formation of the waveguide cores 19.

Figure 1C:
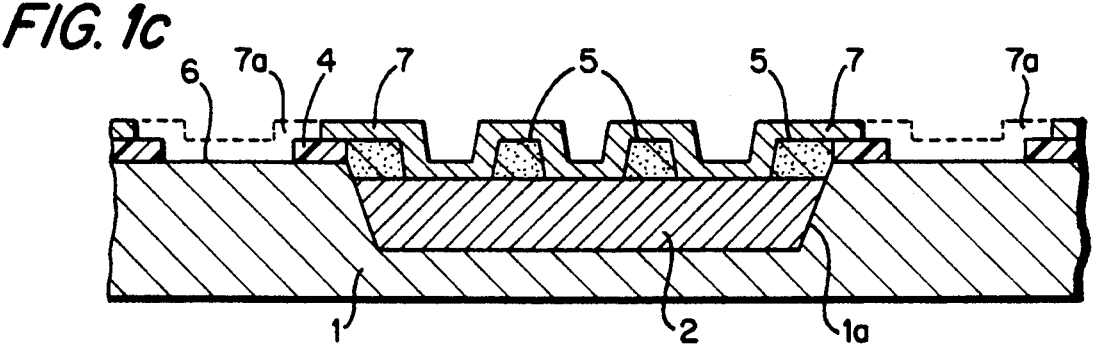
Figure 1D:
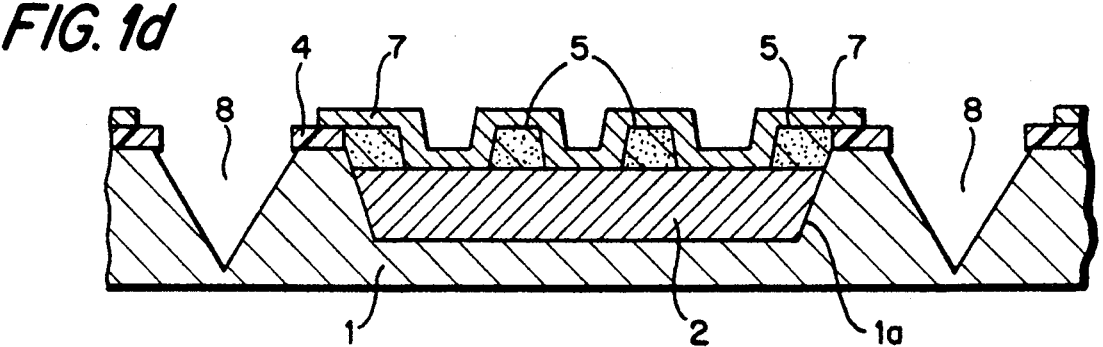

The overlay layer 21 is then coarsely patterned, and a buffered HF etchant is used to remove those parts of this layer in the regions of the V-groove windows 20. This stage of the process, which is equivalent to that shown in FIG. 1c, is illustrated in FIG. 4a. Finally, V-grooves 22 are formed by etching (using an anisotropic etchant such as EDP) through the windows 20.

Figure 5A:
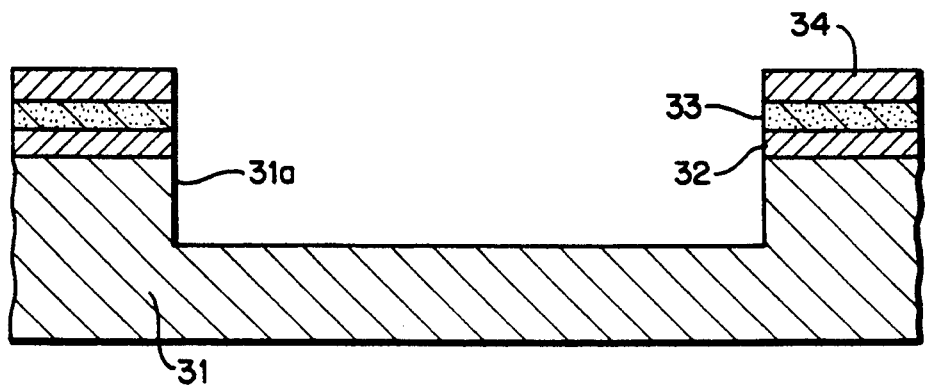
FIGS. 5 (FIG. 5a–FIG. 5c), 6 (FIG. 6a–FIG. 6d) and 7 (FIG. 7a–FIG. 7b) illustrate three other methods of carrying out the preliminary stages referred to above.

In a modification of the process described above with reference to FIGS. 3 and 4, the bird's head can be eliminated by preventing oxidation of the sidewall of the recess in which the buffer oxide is grown. FIG. 5 shows the initial stages of the modified process, these stages being equivalent to those shogun in FIG. 2. A thermally grown, 700 Å thick, pad oxide layer 32 is formed on a silicon substrate 31. A 1000 Å thick silicon nitride layer 33 is then formed on top of the pad oxide layer 32 by LPCVD. A 2000 Å thick oxide layer 34 is then formed by PECVD, and a vertically-walled recess 31a is formed by a dry etching process. This process uses $CHF_3$ to etch the oxide and nitride layers 32, 33 and 34, and then $Cl_2$ to etch the silicon substrate 31. This stage of the process is shown in FIG. 5a. The oxide layer 34 prevents thinning of the nitride layer 33 during the side wall spacer etch step.

Figure 5B:
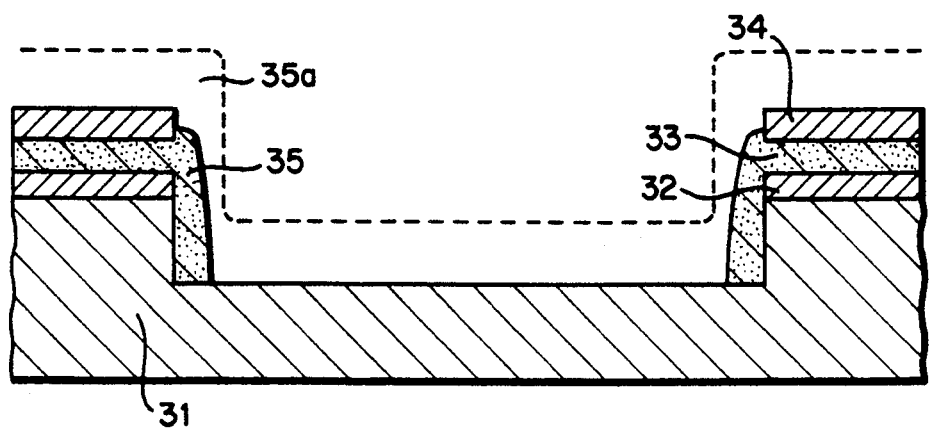
Figure 5C:
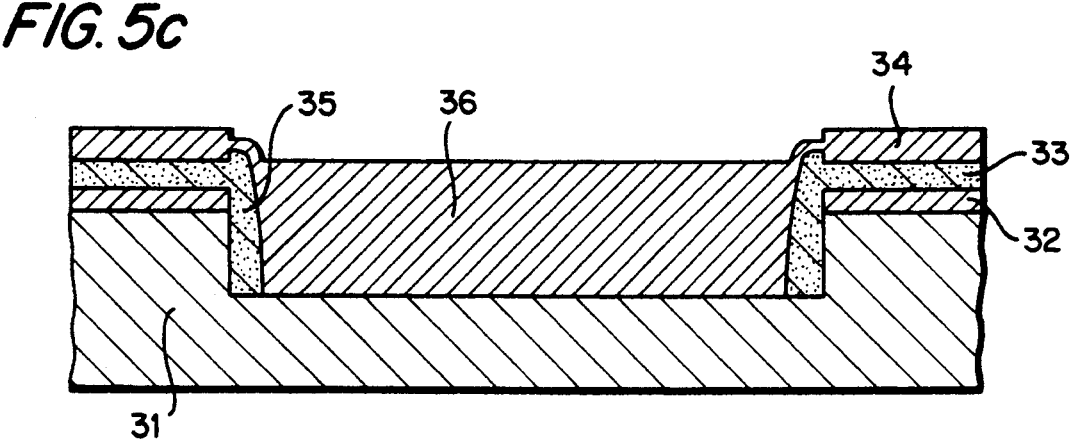
Figure 6A:
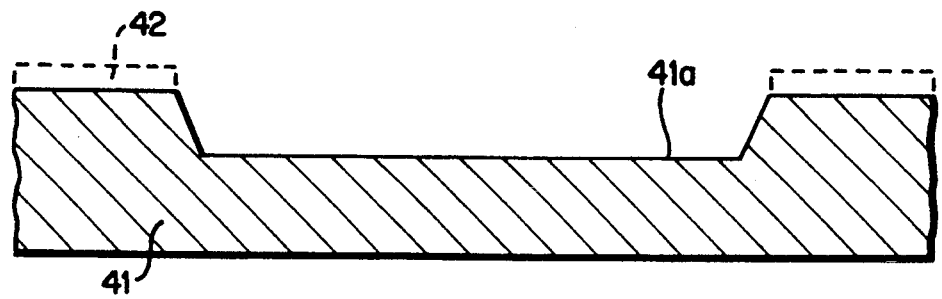
Figure 6B:
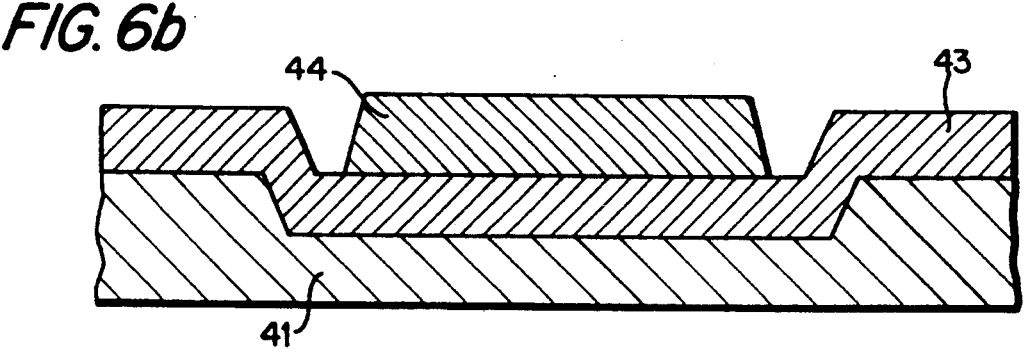
Figure 6C:
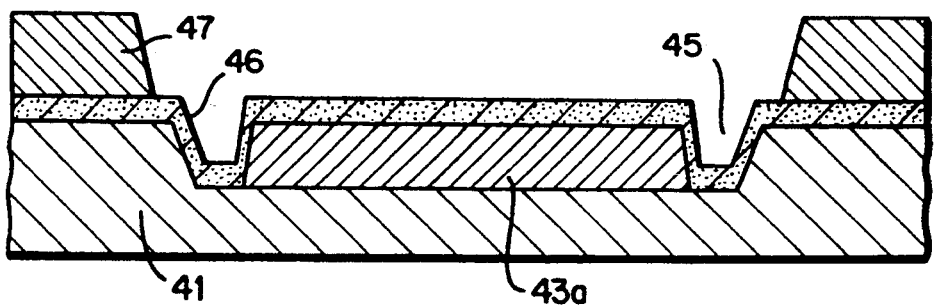
Figure 6D:
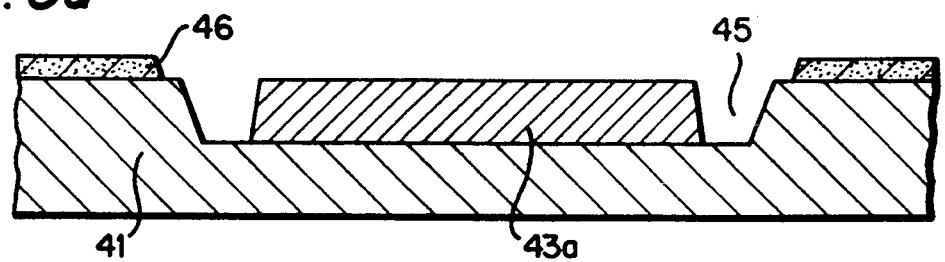

Silicon nitride spacers 35 are then formed on the vertical side walls of the recess 31a. The spacers 35 are formed by the conformal deposition of a film 35a of nitride using LPCVD, followed by a dry etch back of the nitride film using an anisotropic etchant such as $CHF_3$ and oxygen. This stage of the process is shown in FIG. 5b. A 6 μm thick layer of buffer oxide 36 is then thermally grown in the recess 31a by heating the substrate for 130 hours in steam at 1000° C. This stage of the process is shown in FIG. 5c. The subsequent processing then follows the steps described above with reference to FIGS. 3 and 4.

FIG. 6 shows an alternative process to the LOCOS process of either FIG. 2 or FIG. 5. This alternative process involves global oxidation on a recess. Firstly, a recess 41a is etched in the substrate 41, the recess being formed in the same manner as the recess 11a of the embodiment of FIG. 2. The mask (nitride) 42 through which the recess 41a is etched is then stripped away (see FIG. 6a) using orthophosphoric acid. A buffer oxide layer 43 is then deposited by PECVD over the entire surface of the substrate 41. Alternatively, the oxide layer 43 can be thermally grown. The oxide layer 43 is then coarsely patterned using a photoresist layer 44 (see FIG. 6b). The oxide layer 43 is then removed in the non-patterned areas, using buffered HF as etchant, thereby leaving an island 43a of buffer oxide for subsequent waveguide core formation. A trough 45 surrounds the island 43a within the recess 41a, the trough being formed because of alignment errors. Alternatively, a narrow ridge may be left surrounding the recess 41a, before being removed by a planarisation and etch back process. In this case, the buffer oxide 43a completely fills the recess 41a, and the trough 45 is absent.

A 1000 Å thick layer 47 of nitride is then deposited over the entire surface by LPCVD. A photoresist mask 47 (for coarse alignment of the V-grooves) is then formed on the nitride layer 46 (see FIG. 6d). A subsequent etching step, using $CHF_3$ and oxygen as etchant, is then carried out to define the mask through which the V-grooves will eventually be formed (see FIG. 3d). The subsequent processing then follows the steps described above with reference to FIGS. 3 and 4.

Figure 7A:
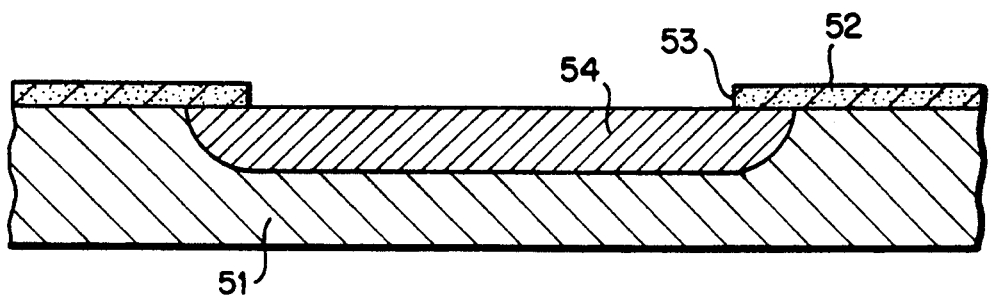
Figure 7B:
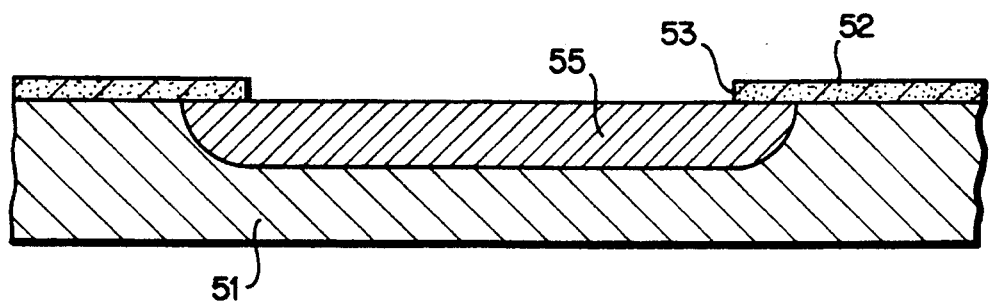

FIG. 7 shows a further alternative process to the LOCOS process of either FIG. 2 or FIG. 5. This process is based on the porous anodisation of silicon. Thus, when a silicon substrate is biased anodically in an electrochemical cell containing an HF electrolyte, the silicon is converted to a porous matrix, the porosity of the matrix being related to the current flow through the substrate and its doping level, with p+ silicon being anodised preferentially. Subsequent rapid diffusion of oxygen through the porous matrix results in rapid formation of thick oxide films. In the process shown in FIG. 7, a 1000 Å thick silicon nitride film 52 is deposited by LPCVD onto an n-type silicon wafer 51. A window 53 is then opened up, using orthophosphoric acid as etchant, where oxide is required. A high concentration of boron is diffused through the window 53 to form a p+ silicon region 54 (see FIG. 7a). This region 54 is then porously anodised, and subsequently converted to a fully stoichiometric oxide 55 during a short thermal oxidation step. FIG. 7b shows the silicon wafer 51 at this stage of the process, subsequent processing steps being as those described above with reference to FIGS. 3 and 4.

It will be apparent that any of the basic processes described above with reference to the drawings could be modified or extended. Of the several possible extensions to the basic waveguide process, two are of particular interest—namely the provision of slots for add-in components such as lasers, and the addition of a second waveguiding layer of silicon (oxy) nitride beneath the doped oxide waveguide cores. Where a slot is to be cut into a substrate for component insertion, the mask pattern must be defined prior to the V-groove formation but the slot etched afterwards. This requires a masking layer which does not etch during the waveguide core or V-groove etching steps. A double-layer mask comprising polysilicon and nitride would be appropriate, or a suitable metal could be used.

There are many uses for a substrate containing separate wavguiding films of oxide and nitride. Silicon nitride has also been suggested for strip loading of waveguides, particularly for Fourier elements such as lenses, diffraction gratings or other holograms. A thin nitride layer beneath the doped oxide will serve either or both of these functions, and this nitride can also serve as the V-groove mask. Care must be taken with the critical alignment, as this changes with application. When strip loaded guides are used, the critical alignment is between the strip loading layer (i.e. the nitride, not the oxide) and the grooves. When two waveguide layers are used, V-grooves used for fibres should align to the oxide waveguide stripes, but others, e.g. those for drop-in lasers, should align to the nitride waveguide stripes.

It should be noted that the references above to doped oxide layers refer to dopants which increase the refractive index of those layers. It will be apparent that undoped oxide layers could be used for waveguide core formation if both the buffer and overlay layers are doped so as to reduce their refractive indices. Moreover, the core layer could be formed from any other suitable material such as silicon nitride, titanium dioxide or germanium dioxide.

It may be appropriate, when using waveguide cores requiring very high temperature processing steps such as FHD, to remove the protective nitride layer before depositing the core layer. In this case, a replacement nitride layer must be deposited and cut away from the waveguide region prior to the critical patterning of the features.

I claim:

1. A method of forming at least one V-groove in alignment with at least one planar waveguide on a silicon substrate, the method comprising the steps of:
    simultaneously forming a core for the at least one waveguide and a respective window for the at least one V-groove, covering the at least one core with a protective layer, and forming the at least one V-groove through the respectively corresponding window.

2. A method of forming a pair of V-grooves in alignment with an array of planar waveguides, the method comprising the steps of:

simultaneously forming cores for the waveguides and windows for the V-grooves, covering the cores with a protective layer, and forming the V-grooves through the windows, the method including the formation of a V-groove on each side of the array of waveguides.

3. A method as in claim 1 or 2, wherein each waveguide core and each window are formed by an etching process.

4. A method as in claim 1 or 2, further comprising the steps of:

forming a buffer oxide layer on the silicon substrate prior to the step of forming a waveguide core and window, and forming the waveguide core on a buffer oxide layer.

5. A method as in claim 4, wherein the buffer oxide layer is formed in a recess in a silicon substrate.

6. A method as in claim 1 or 2, wherein an overlay oxide layer constitutes the protective layer.

7. A method as in claim 1 or 2, wherein the at least one V-groove is formed by etching through a respectively associated window.

8. A method as in claim 1 or 2, wherein the at least one waveguide core is formed from a layer of doped oxide.

9. A method as in claim 5 further comprising the steps of:

forming a pad oxide layer on the silicon substrate and then a silicon nitride layer on the pad oxide layer, the silicon nitride layer forming a mask through which the recess in the silicon substrate is subsequently formed.

10. A method as in claim 9, wherein the pad oxide layer is thermally grown to a thickness of 700 Å and the silicon nitride layer is deposited by LPCVD to a thickness of 3000 Å.

11. A method as in claim 9, wherein the recess is formed by a wet etching process.

12. A method as in claim 5 further comprising the steps of:

forming a pad oxide layer on the silicon substrate, a silicon nitride layer on the pad oxide layer, and a further oxide layer on the silicon nitride layer, the further oxide layer forming a mask through which the recess in the silicon substrate is subsequently formed.

13. A method as in claim 12, wherein:

the pad oxide layer is thermally grown to a thickness of 700 Å, the silicon nitride layer is deposited by LPCVD to a thickness of 1000 Å, and the further oxide layer is formed by PECVD to a thickness of 2000 Å.

14. A method as in claim 12, wherein the recess is formed with vertical side walls by a dry etching process.

15. A method as in claim 14, further comprising the step of:

forming nitride spacers on vertical side walls of the recess, the nitride spacers being formed by conformal deposition of silicon nitride using LPCVD followed by an anisotropic dry etch of the nitride film.

16. A method as in claim 9, wherein the buffer oxide is thermally grown in the recess.

17. A method as in claim 16, wherein the buffer oxide is subjected to a planarisation step.

18. A method as in claim 17 wherein the at least one waveguide core is formed from a layer of doped oxide deposited after the planarisation step.

19. A method as in claim 18, wherein the doped oxide layer is removed in a region where the at least one V-groove is to be formed.

20. A method as in claim 19, wherein a wet buffered HF etching process is used to remove the doped oxide layer in the said region.

21. A method as in claim 9, wherein the buffer oxide is formed over the entire surface of the substrate, and subsequently removed everywhere except within a region occupying the major portion of the recess.

22. A method as in claim 21, wherein the buffer oxide is thermally grown.

23. A method as in claim 21, wherein the buffer oxide is removed by etching through a photo-resist mask deposited on top of the buffer oxide.

24. A method as in claim 4, wherein the buffer oxide is formed by porous anodisation of the silicon substrate.

25. A method as in claim 24, wherein the porous anodisation process comprises the steps of:

(i) depositing a silicon nitride film onto an n-type silicon substrate;

(ii) forming a window in the silicon nitride layer;

(iii) diffusing a high concentration of boron through the window to form a p+ silicon region;

(iv) converting the p+ silicon region by anodising in HF; and (v) subjecting the substrate to a thermal oxidation step in which the porous silicon is converted to a fully dense oxide with substantially no volume change.

* * * * *